United States Patent
Thorland et al.

[11] Patent Number: 5,960,025
[45] Date of Patent: Sep. 28, 1999

[54] DEVICE AND METHOD FOR ACHIEVING BEAM PATH ALIGNMENT OF AN OPTICAL CAVITY

[75] Inventors: Rodney H. Thorland, Shoreview; Daniel L. Sittler, Hugo; David W. Carlson, Vadnais Heights, all of Minn.; Gerald R. Altmann, Roberts, Wis.

[73] Assignee: Honeywell Inc., Minneapolis, Minn.

[21] Appl. No.: 08/944,232

[22] Filed: Oct. 6, 1997

[51] Int. Cl.[6] .................................................. H01S 3/08
[52] U.S. Cl. ............................ 372/107; 372/98; 372/99; 372/108
[58] Field of Search .................................. 372/9, 15, 92, 372/94, 98, 99, 107, 108; 356/345, 349, 350

[56] References Cited

U.S. PATENT DOCUMENTS

| | | | |
|---|---|---|---|
| 3,581,227 | 5/1971 | Podgorski | 372/107 X |
| 3,913,032 | 10/1975 | Haans | 372/107 X |
| 4,113,387 | 9/1978 | Shutt | 356/106 |
| 4,217,559 | 8/1980 | Van Den Brink et al. | 372/107 X |
| 4,628,515 | 12/1986 | Rodloff et al. | 372/107 |
| 4,648,692 | 3/1987 | Kinoshita | 372/107 X |
| 4,691,323 | 9/1987 | Ljung et al. | 372/107 |
| 4,777,639 | 10/1988 | Whitehouse | 372/107 |
| 4,831,632 | 5/1989 | Simms | 372/107 |
| 4,861,160 | 8/1989 | Hammons et al. | 356/138 |
| 4,865,436 | 9/1989 | Ahonene et al. | 372/107 X |
| 4,884,283 | 11/1989 | Rahn et al. | 372/107 |
| 4,892,497 | 1/1990 | Chaffee | 445/28 |
| 4,951,285 | 8/1990 | Cole et al. | 372/19 |
| 5,101,415 | 3/1992 | Kolb et al. | 372/99 |
| 5,137,358 | 8/1992 | Perkins | 356/350 |
| 5,308,575 | 5/1994 | Ford | 419/37 |
| 5,420,685 | 5/1995 | Podgorski | 356/350 |
| 5,438,410 | 8/1995 | Killpatrick et al. | 356/350 |
| 5,448,354 | 9/1995 | Schmars et al. | 356/350 |
| 5,848,090 | 12/1998 | Zoll et al. | 372/93 |

FOREIGN PATENT DOCUMENTS

| | | | |
|---|---|---|---|
| 0157319 | 10/1985 | European Pat. Off. | H01S 3/083 |
| 2157067 | 10/1985 | United Kingdom | H01S 3/083 |

OTHER PUBLICATIONS

Patent Abstracts of Japan, vol. 017, No. 004 (P–1464), Jan. 6, 1993 and JP 04 238217 (Toshiba Corp.) Aug. 26, 1992.

*Primary Examiner*—Brian Healy
*Attorney, Agent, or Firm*—Albert K. Kau

[57] ABSTRACT

Disclosed is a mirror mounting device and method for beam path alignment of an optical cavity for a ring laser gyroscope. The ring laser gyroscope is of the type that includes a block having an optical cavity that defines a closed loop optical path. A light source directs a light beam into the path. The block includes mounting surfaces for mirrors that reflect the light beam at the optical path corners. The mirror mounting device is associated with one of the block mounting surfaces and acts to orient a concave reflective surface of one of the mirrors such that the light beam is aligned within the closed loop optical path and is at its maximum intensity irrespective of the position of the concave reflective surface of the mirror relative to its mounting surface.

22 Claims, 5 Drawing Sheets

DEVICE AND METHOD FOR ACHIEVING BEAM PATH ALIGNMENT OF AN OPTICAL CAVITY

BACKGROUND OF THE INVENTION

This invention relates to optical cavities. In particular, the present invention is a mirror mounting device and method for achieving optical alignment of mirrors assembled to form an optical cavity.

One embodiment of this invention is application to a ring laser gyroscope (RLG). A RLG is commonly used to measure the angular rotation of a vehicle, such as an aircraft. Such a gyroscope has two counter-rotating laser light beams which move within a closed loop path or "ring" with the aid of successive reflections from multiple mirrors. The closed path is defined by an optical cavity which is interior to a gyroscope frame or "block". In one type of RLG, the block includes planar top and bottom surfaces that are bordered by six planar sides that form a hexagon shaped perimeter. Three planar non-adjacent sides of the block form the mirror mounting surfaces for three mirrors at the corners of the optical path which is triangular in shape.

Operationally, upon rotation of the RLG about its input axis (which is perpendicular to and at the center of the planar top and bottom surfaces of the block), the effective path length of each counter-rotating laser light beam changes and a frequency differential is produced between the beams that is nominally proportional to angular rate. This differential is then measured by signal processing electronics to determine the angular rotation of the vehicle.

To produce accurate angular rate data (i.e., to minimize RLG bias errors), the counter-rotating laser light beams must be at substantially maximum intensity as they traverse the closed loop optical path defined by the optical cavity. To attain maximum light intensity, the counter-rotating laser light beams must be aligned within apertures of the optical cavity. However, a RLG block typically has unavoidable inaccuracies (otherwise known as "block geometry errors") that result from the block manufacturing process (i.e., the process of forming, machining and polishing the block). These geometry errors typically take the form of mirror mounting surface "tilt" with respect to the optical cavity apertures which define the desired closed loop optical path within the block. The tilted mirror mounting surfaces affect laser light beam alignment (or position) with respect to the apertures and thereby laser light intensity, causing inaccurate angular rate data. Therefore, a beam alignment process and/or apparatus is needed to properly position the counter-rotating laser light beams within the optical cavity.

Typically in a RLG block having a triangular shaped optical path incorporating three mirrors, one of the mirrors has a concave reflective surface while the other two mirrors have planar reflective surfaces. The curved mirror serves two main purposes. First, the curvature of the reflective surface controls the diameter and the primary mode of the counter-rotating laser light beams. Second, the curvature of the reflective surface is used to align the counter-rotating laser light beams within the optical cavity so that the light beams are at substantially maximum intensity to minimize RLG bias errors. In particular, this latter purpose is accomplished due to the inherent attributes of the concave reflective surface. By nature, the angle of the surface of a concave mirror varies in accordance with its curvature. Therefore, an incident laser light beam can be redirected or "steered" by translating (i.e., moving) the curved mirror within the plane of its respective block mounting surface.

In practice, with the two planar mirrors already mounted on the block, the concave mirror is translated to selectively steer the light beam within the optical cavity via a conventional mirror movement mechanism. During translation of the concave mirror, a detector, such as a photodiode, senses the intensity of the laser light output from the cavity through one of the planar mirrors that is partially transmissive. The photodiode generates an electrical signal representative of the intensity of the laser light output from the optical cavity. This signal is monitored by a voltmeter during such translations of the concave mirror until a mirror position is found exhibiting a maximum output on the voltmeter. This mirror position indicates that the counter-rotating laser light beams are at substantially maximum intensity and therefore are optimally aligned within the apertures of the optical cavity. The concave mirror is then secured to its mounting surface on the block at the optimum mirror position to complete the laser light beam alignment process.

Though the above described alignment mechanism and process adequately aligns the counter-rotating laser light beams within the optical cavity of the block so as to minimize RLG bias errors, there is at least one disadvantage. The mechanism and process described requires a great deal of handling of the concave mirror, particularly when translating the mirror about its mounting surface to identify the mirror's optimum mirror mounting position. The greater the extent of concave mirror manipulation, the better the chance of introducing contaminants (i.e., dirt) to or damaging the delicate reflective surface of the mirror. Any damage and/or contamination increases the likelihood of bias errors and degrades RLG performance. If the bias errors are too great and/or the RLG performance too corrupted, the RLG must be rebuilt or scraped. This increases the manufacturing cost of producing the RLG's.

There is a need for improved device and method for achieving optical alignment of an optical cavity such as the optical cavity of an RLG. In particular, there is a need for a mirror alignment device and method that reduces the amount of mirror handling needed align the light beams within the optical cavity. In addition, the device and method should reduce the likelihood of mirror reflective surface damage and/or contamination during alignment, to reduce the number of RLG's needing to be rebuilt or scraped. Lastly, the mirror alignment device and method should be relatively easy and inexpensive to practice and should greatly facilitate automation of assembly.

SUMMARY OF THE INVENTION

The present invention is a device and method for achieving alignment of an optical cavity such as employed in a RLG. The RLG includes a structural frame (or "block") having internal apertures provided to allow a closed loop optical path. The block has mounting surfaces at corners of the optical path. A first mounting surface of the mounting surfaces has a mirror mounting device. A light source directs a light beam into the optical path of the optical cavity. Mirrors are secured to the mounting surfaces so that each mirror reflects that light beam at its respective corner of the optical path. One of the mirrors has a curved reflective surface and is secured to the mounting device of the first mounting surface. The mounting device orients the curved reflective surface of the one mirror such that the light beam is aligned within the closed loop optical path, and the light beam is at its maximum intensity irrespective of the position of the curved reflective surface mirror relative to the first mounting surface. The method of beam path alignment of the RLG entails providing the first mounting surface with the mounting device, and engaging the curved reflective surface mirror with the mounting device to achieve beam optical path alignment.

This mounting device and method for beam path alignment reduces the amount of the mirror handling needed to align the light beam within the optical cavity. Mirror handling is substantially reduced because the prior art method of translating the curved mirror about its mounting surface to identify the mirror's optimum mirror mounting position is unnecessary. Therefore, this mounting device and method decreases the likelihood of mirror reflective surface damage and/or contamination during alignment, and therewith decreases the number of RLG's needing to be rebuilt or scraped. In addition, this mirror mounting device and method is relatively easy and inexpensive to practice and greatly facilitates automation of assembly operations.

DETAILED DESCRIPTION OF THE PREFERRED EMBODIMENT

Figure 1:
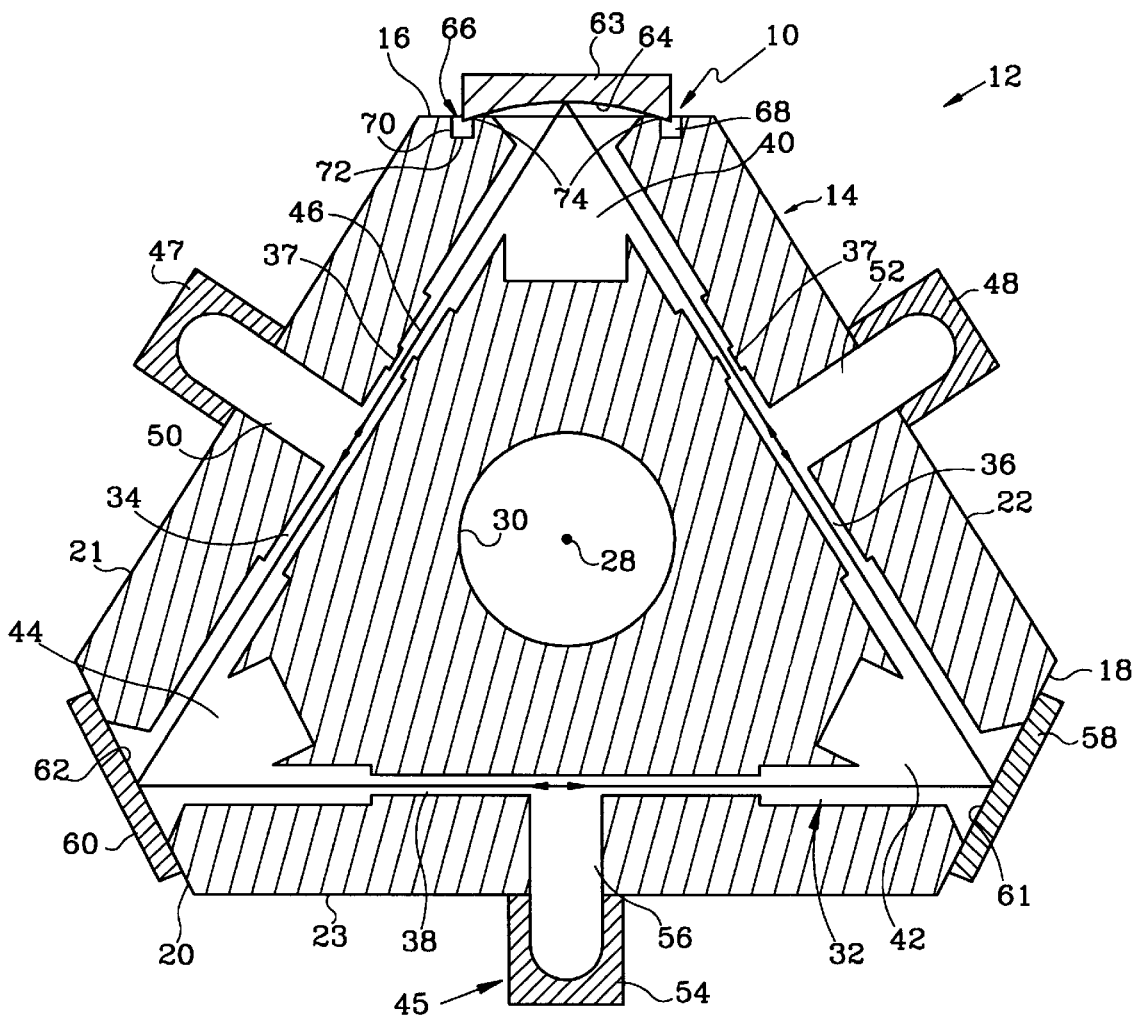
FIG. 1 is a plan sectional view of a ring laser gyroscope (RLG) incorporating a mirror mounting device and method for beam path alignment in accordance with the present invention.
Figure 4:
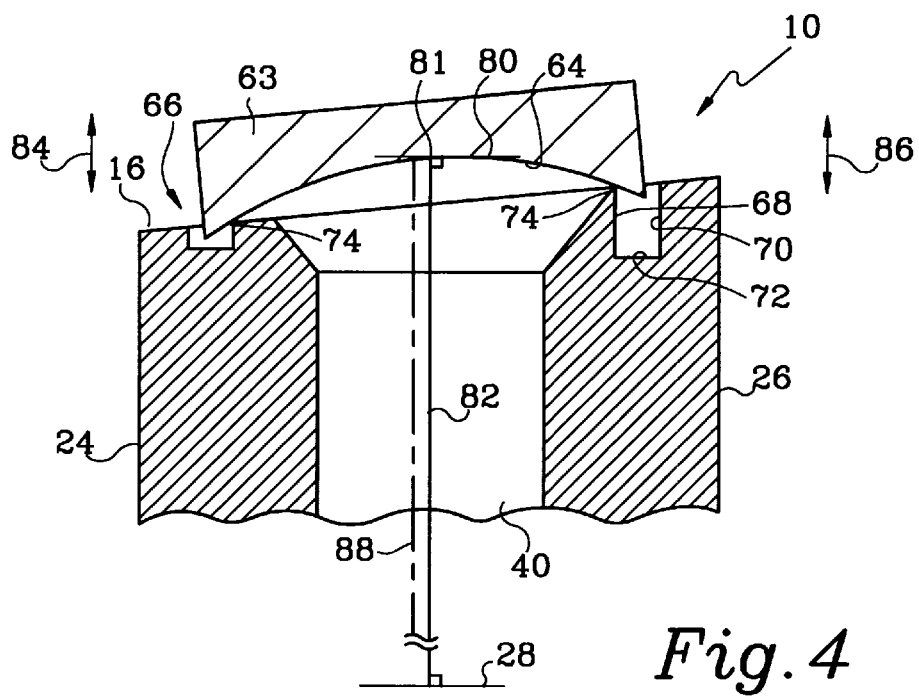
FIG. 4 is an enlarged partial, edge sectional view of the mirror mounting device and method for beam path alignment with a concave mirror shown in a first orientation.
Figure 5:
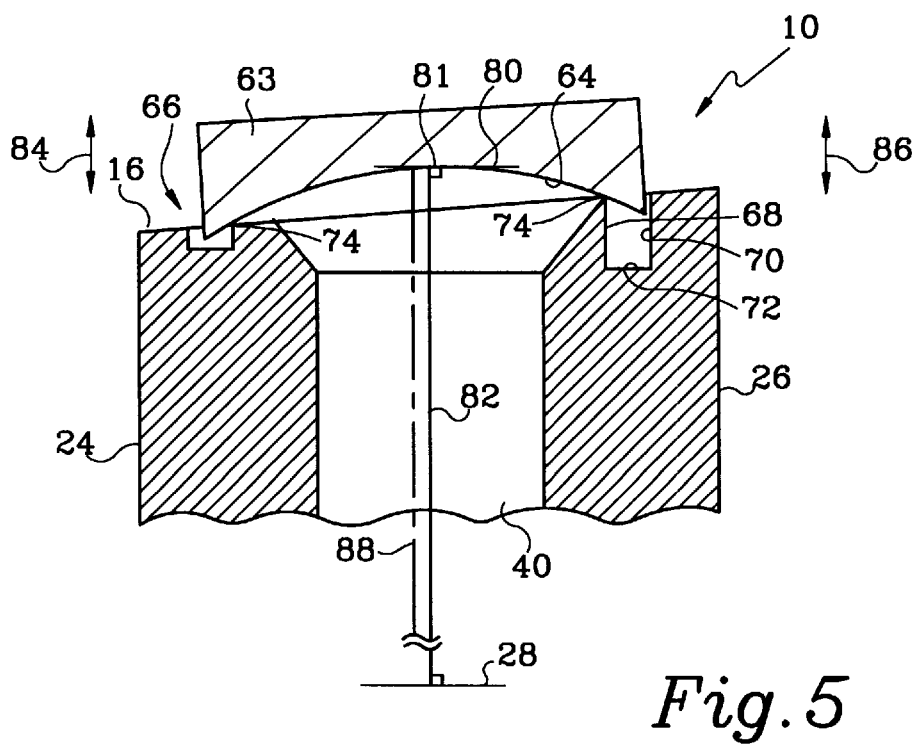
FIG. 5 is an enlarged partial, edge sectional view, similar to FIG. 4, of the mirror mounting device and method for beam path alignment with the concave mirror shown in a second orientation.
Figure 6:
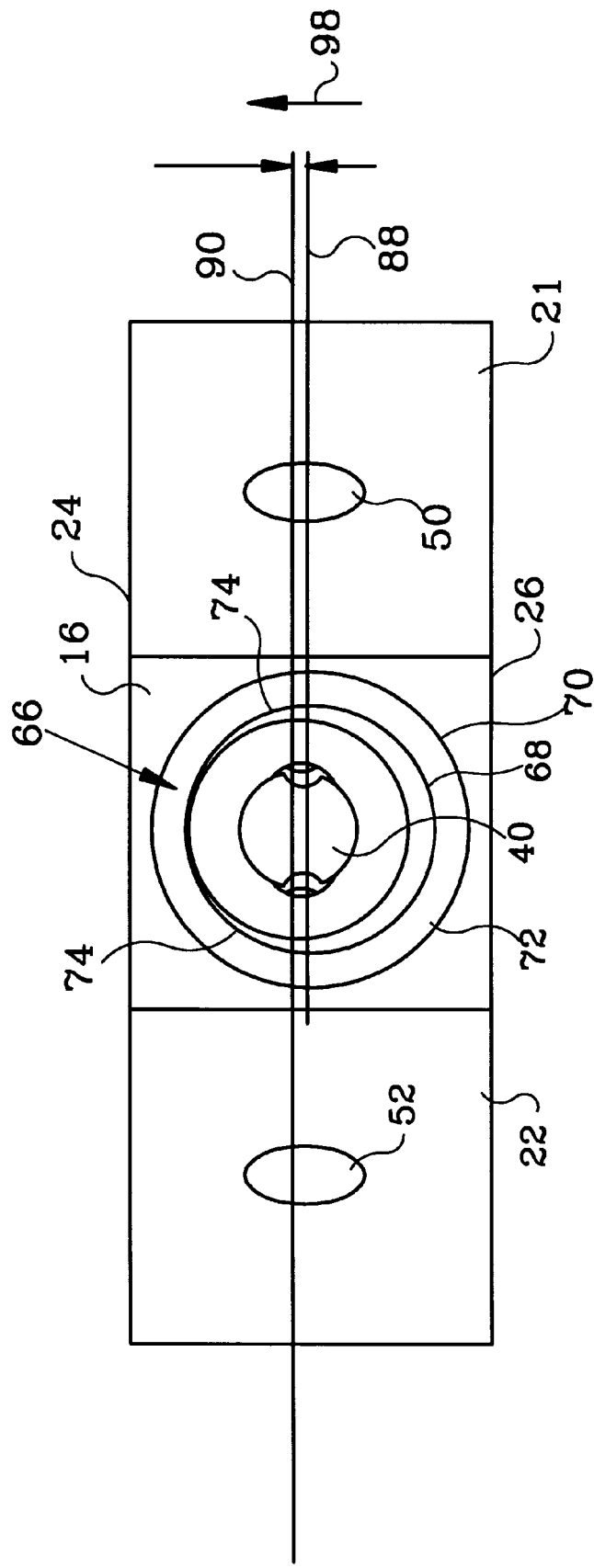
FIG. 6 is a partial edge elevational view of the mirror mounting device and method for beam path alignment with the concave mirror removed for clarity.

A mirror mounting device 10 and method for beam path alignment of a ring laser gyroscope (RLG) 12 in accordance with the present invention is illustrated generally in FIG. 1. The RLG 12 includes a gyroscope frame or block 14. The block 14 is generally triangular shaped with a hexagonal outer periphery. The hexagonal outer periphery includes three planar non adjacent sides that form first, second and third mirror mounting surfaces 16, 18 and 20, respectively, and three further planar non adjacent sides 21, 22 and 23, respectively. The mounting surfaces 16, 18 and 20 and sides 21, 22 and 23 form a border for planar top and bottom surfaces 24 and 26 (see FIGS. 4–6), respectively, of the block 14. The block 14 is centered about an input axis 28 (which is perpendicular to top and bottom surfaces 24 and 26) within a circular inner boundary 30 of the block 14. The block 14 is formed of a glass ceramic or like material. Suitable block materials include the glass ceramic material marketed under the trademarks "Cervit" and "Zerodur". A suitable glass material is marketed under the trademark "BK-7".

As seen best in FIG. 1, an internal optical cavity 32 of the block 14 comprises three substantially straight laser bores 34, 36 and 38, respectively, that are interconnected at the mounting surfaces 16, 18 and 20 by three cylindrical shaped wells 40, 42 and 44, respectively. The bores 34 and 36 include apertures 35 and 37, respectively, that define a desired closed loop optical path. The bores 34, 36 and 38 and the wells 40, 42 and 44 are bored within the block 14 to form the triangular shaped closed loop optical path, with the mounting surfaces 16, 18 and 20 located at corners of the optical path. A laser gain source 45 for directing a pair of counter-rotating laser light beams 46 into the optical path defined by the optical cavity 32 includes a pair of anodes 47 and 48, respectively. The anodes 47 and 48 are bonded to sides 21 and 22, respectively, of the block 14 and are adapted to communicate with laser bores 34 and 36, respectively, through interconnect cavities 50 and 52, respectively. A cathode 54, of the gain source 45, is bonded to side 23 of the block 14 and communicates with laser bore 38 through interconnect cavity 56. A quantity of lasing gas, such as HeNe, is contained within the optical cavity 32.

In operation, with a sufficiently large potential applied between the cathode 54 and the anodes 47 and 48 a pair of electrical discharges flow between the cathode 54 and the anodes 47 and 48. The discharge currents ionize the lasing gas and thereby provide the optical gain to sustain the pair of counter-rotating laser light beams 46 within the closed loop optical path defined by the optical cavity 32.

As seen best in FIG. 1, two planar mirrors 58 and 60, respectively, having flat reflective surfaces 61 and 62, respectively, are secured (for example, via optical contact, epoxy bonding or fritting) to the second and third mirror mounting surfaces 18 and 20, respectively. A curved mirror 63, having a concave reflective surface 64 is secured (via epoxy bonding or fritting) to the mirror mounting device 10 associated with the first mirror mounting surface 16. The reflective surfaces 61, 62 and 64 of each of the mirrors 58, 60 and 63 reflects the light beams 46 at its respective corner of the closed loop optical path defined by the optical cavity 32.

As seen in FIGS. 1–6, the mirror mounting device 10 includes a circular shaped channel 66 formed in the block 14 at the first mounting surface 16. The cylindrical well 40 is surrounded by the circular channel 66. As seen best in FIGS. 2–5, the circular channel includes inner and outer concentric sidewalls 68 and 70, respectively, and a bottom wall 72. The inner and outer sidewalls 68 and 70 may, as shown, be perpendicular to the first mounting surface 16, however, perpendicularity is not essential to the invention. The intersection of the inner sidewall 68 and the first mounting surface 16 defines a circular edge surface 74 of the mounting device 10. The concave reflective surface 64 of the curved mirror 63 engages and is secured to the edge surface 74 of the mounting device 10. In practice, the circular channel 66 is machined, such as by milling, into the block 14. In one preferred embodiment, the circular channel has a width of 0.155 inches between the inner and outer sidewalls 68 and 70, and a depth to the bottom wall 72 from the first mounting surface 16 of 0.008 inches.

Figure 2:
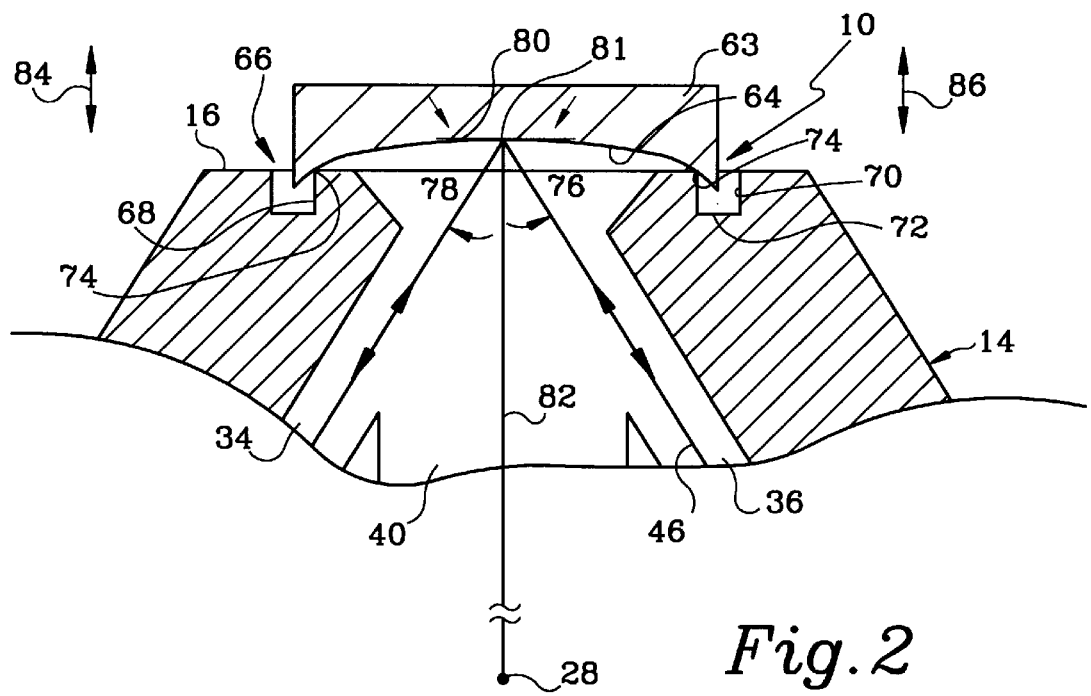
FIG. 2 is an enlarged partial, plan sectional view of the mirror mounting device and method for beam path alignment with a concave mirror shown in a first orientation.
Figure 3:
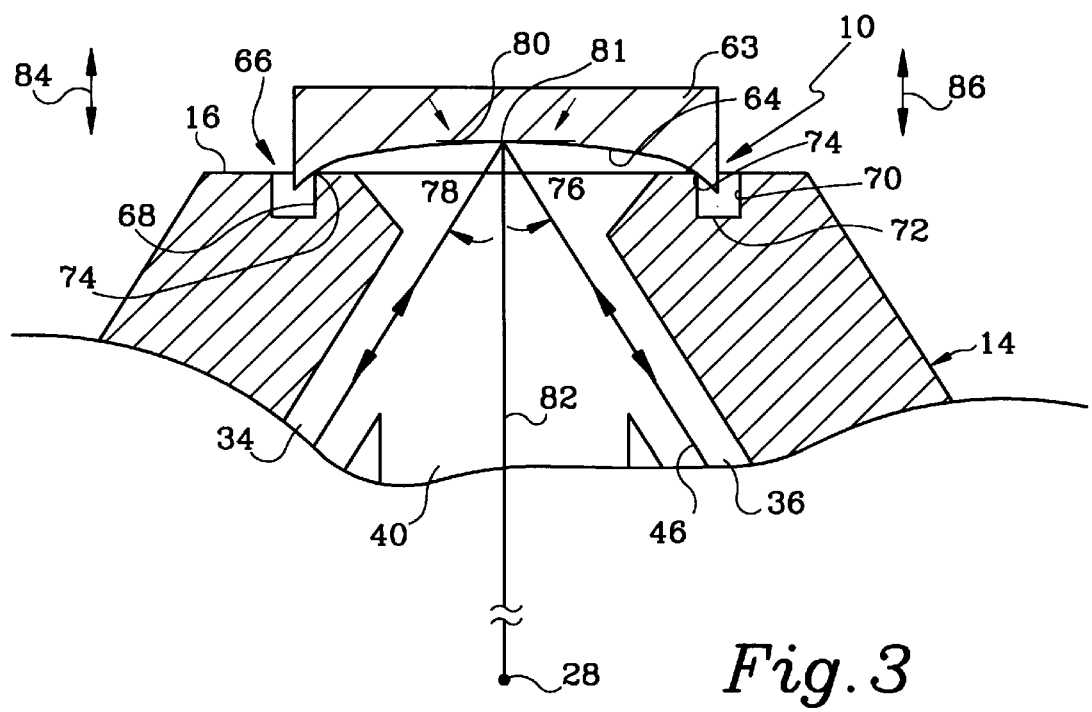
FIG. 3 is an enlarged partial, plan sectional view, similar to FIG. 2, of the mirror mounting device and method for beam path alignment with the concave mirror shown in a second orientation.

As seen best in FIGS. 2 and 3 (these figures illustrating two different positions of the curved mirror 63 relative to the first mounting surface 16 and the mounting device 10), an angle of egress 76 and an angle of ingress 78 relative to a line 80 tangent to the concave reflective surface 64 at a point of reflectance 81 of the light beams 46 reflected by the curved mirror 63 are always substantially the same angle, irrespective of the position (i.e., orientation) of the curved mirror 63 relative to the first mounting surface 16 or the mounting device 10. For example, for the RLG 12 which is shaped like an equilateral triangle, the angles of egress and ingress 76 and 78 will be substantially 60° whatever the position of the curved mirror 63. For a square shaped RLG, the egress and ingress angles will be substantially 45°. Described another way and depicted best in FIGS. 4 and 5, a line 82 (line 82 being coincidental to laser light beams 46 in FIGS. 4 and 5) extending between the point of reflectance 81 and the input axis 28 of the block 14 is always perpendicular to tangent line 80 and input axis 28, irrespective of the position (i.e., orientation) of the curved mirror 63 relative to the first mounting surface 16 or the mounting device 10.

The above statements are accomplished as long as a substantial portion of the edge surface 74 engages the concave reflective surface 64 of the curved mirror 63. The edge surface 74 and channel 66 coact with the concave reflective surface 64 to automatically allow the curved mirror 63 to self-align in accordance with the above set forth parameters. This self-alignment coaction takes the form of the ends of the curved mirror 63 moving appropriately towards and away from the mounting surface 16 (as represented by double headed arrows 84 and 86 in FIGS. 2–5) to achieve the proper orientation of the curved mirror 63. Hence, in accordance with the mirror mounting device 10 and method of beam path alignment of the present invention, translating the curved mirror 63 relative to the first mounting surface 16 does not "steer" (i.e., redirect) the light beams 46 (as in the prior art) because the light beams 46 reflect off of the concave reflective surface 64 at the same angle no matter what the curved mirror's 63 position is relative to the first mounting surface 16. In accordance with the mirror mounting device 10 and the method of beam path alignment of the present invention, alignment of the laser light beams 46 within the closed loop optical path defined by the optical cavity 32, is a matter of placement of the mirror mounting device 10 relative to the first mounting surface 16. In other words, beam path alignment becomes a matter of block 14 geometry with positioning of the curved mirror 63 no longer a critical part of aligning the light beams 46 within the apertures 35 and 37 of the bores 34 and 36 of the optical cavity 32.

To compensate for the "tilt" (i.e., "block geometry errors") of the mirror mounting surfaces 16, 18 and 20 relative to the planar top and bottom surfaces 24 and 26 of the block 14, the mounting device 10 is located on the first mirror mounting surface 16 in accordance with the equation:

$$d = r * \alpha * 4.85E{-}06 \text{ radians/arc-second}$$

where
- r=the radius of curvature (in inches) of a concave reflective surface 64 of the curved mirror 63,
- α(see FIG. 8) is the pyramidal angle (in arc-seconds) of the mounting surfaces 16, 18 and 20 of the block 14, and
- d (see FIG. 6) is the distance (in inches), relative to the internal optical cavity apertures 35 and 37 of the optical cavity 32 for the block 14, a center line 88 of the circular edge surface 74 of the mirror mounting device 10 is offset from a center line 90 of the internal optical cavity apertures 35 and 37 of the optical cavity 32.

Figure 7:
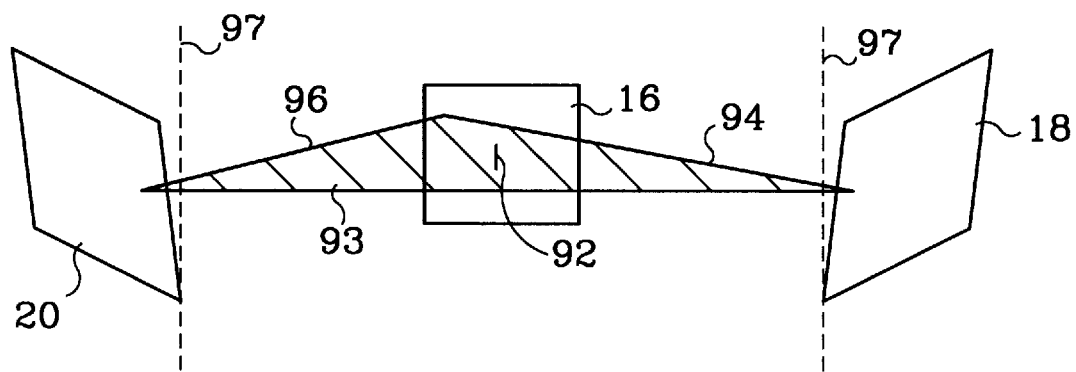
FIG. 7 is a side elevational view of a block of the RLG illustrating the tilt angles of block mirror mounting surfaces for planar mirrors.
Figure 8:
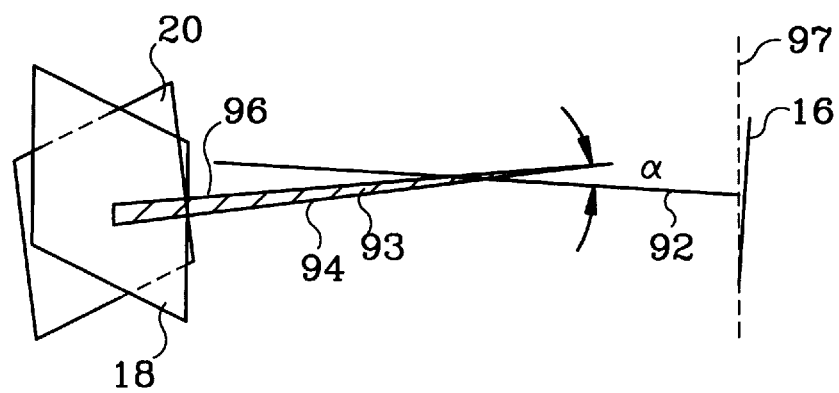
FIG. 8 is a side elevational view of the block illustrating the tilt angle of a block mirror mounting surface for a concave mirror relative to the mounting surfaces for the planar mirrors.

As seen best in FIGS. 7 and 8, the pyramidal angle α is defined by the angle at the intersection of a line 92 extending perpendicular from the first mounting surface and a plane 93 formed by intersecting lines 94 and 96 extending perpendicular from mounting surfaces 18 and 20, respectively. The dashed lines 97 in FIGS. 7 and 8 are normal to the top and bottom surfaces 24 and 26 of the block 14 and are used to help depict the "tilt" of the mounting surfaces 16, 18 and 20. The pyramidal angle α is a measurement determined in a known manner by autocollimator technology. By determining the pyramidal angle α for a particular block 14, and knowing the radius of curvature r of the concave reflective surface 64 of the curved mirror 63, the offset distance d can be determined for proper placement of the circular channel 66 of the mirror mounting 10.

EXAMPLE

A measured pyramidal angle α of 80 arc-seconds and a radius of curvature r of 9.5 inches yields an offset distance d computed as (9.5 inches * 80 arc-seconds * 4.85E–06) 0.0037 inches or 3.7 mils. The sign of d is positive therefore the center line 88 of the circular edge surface 74 of the mirror mounting device 10 is offset (in the direction represented by arrow 98 in FIG. 6) 3.7 mils from the center line 90. An answer for d having a negative sign would of course result in movement of the center line 88 in a direction opposite to that represented by arrow 98.

The method of beam path alignment using the mirror mounting device 10 in accordance with the present invention begins with measuring the pyramidal angle α of the mirror mounting surfaces 16, 18 and 20 of a particular block 14. The placement location of the mounting device 10 on the first mounting surface is then calculated using the equation d=r * α* 4.85E–06. The calculated position of the mounting device 10 is then located on the first mounting surface 16 and the circular shaped channel 66 is machined by milling into the first mounting surface 16 to create the edge surface 74 that supports the curved mirror 63. The concave reflective surface 64 of the curved mirror 63 is then secured to the edge surface 74. The edge surface 74 automatically orients the concave reflective surface 64 of the concave mirror 63 such that the light beams 46 are aligned within the closed loop optical path (defined by the apertures 35 and 37 of the optical cavity 32), and the light beams are at their maximum intensity irrespective of the position of the concave mirror 63 relative to the first mounting surface 16.

This mounting device 10 and method for beam path alignment reduces the amount of the mirror handling needed to align the light beams 46 within the optical cavity 32. Mirror handling is substantially reduced because the prior art method of translating the curved mirror about its mounting surface to identify the mirror's optimum mirror mounting position is unnecessary. Therefore, this mounting device 10 and method decreases the likelihood of mirror reflective surface damage and/or contamination during alignment, and therewith decreases the number of RLG's needing to be rebuilt or scraped. In addition, this mirror mounting device 10 and method is relatively easy and inexpensive to practice and greatly facilitates automation of assembly operations.

Although the present invention has been described with reference to preferred embodiments, workers skilled in the art will recognize that changes may be made in form and detail without departing from the spirit and scope of the invention. For example, though the mounting device 10 and method for beam path alignment has been described with reference to RLG 12, the mounting device 10 and method of alignment can be used in other optical apparatus, such as linear lasers, optical filters and scanning interferometers.

We claim:

1. An optical apparatus, comprising:
    a block having an internal optical cavity that defines a closed loop optical path, the block including:
        a plurality of mounting surfaces at a plurality of corners of the optical path, a first mounting surface of the plurality of mounting surfaces having a mirror mounting means;
    light source means for directing at least one light beam into the optical path of the optical cavity; and
    a plurality of mirrors secured to the plurality of mounting surfaces, each mirror reflecting the at least one light beam at its respective corner of the closed loop optical path, wherein a first mirror of the plurality of mirrors is a curved mirror and is secured to the mounting means of the first mounting surface, the mounting means orienting the curved mirror such that the at least one light beam is aligned within the closed loop optical path and the at least one light beam is at its maximum intensity irrespective of the position of the curved mirror relative to the first mounting surface.

2. The optical apparatus of claim 1 wherein the curved mirror has a concave reflective surface.

3. The optical apparatus of claim 2 wherein the mounting means includes an edge surface that engages the concave reflective surface of the curved mirror.

4. The optical apparatus of claim 3 wherein the edge surface is defined by an intersection of first and second surfaces of the block.

5. The optical apparatus of claim 4 wherein the first surface is the first mounting surface and the second surface is perpendicular to the first mounting surface.

6. The optical apparatus of claim 5 wherein the mounting means includes a channel formed in the block, the channel including parallel first and second sidewalls and a bottom wall.

7. The optical apparatus of claim 6 wherein the channel is circular in shape and wherein the first and second sidewalls are inner and outer concentric sidewalls.

8. The optical apparatus of claim 7 wherein the second surface is the inner sidewall of the circular channel.

9. The optical apparatus of claim 1 wherein an angle of egress and an angle of ingress relative to a tangent line at a point of reflectance of the at least one light beam reflected by the curved mirror are each substantially the same angle irrespective of position of the curved mirror relative to first mounting surface.

10. The optical apparatus of claim 1 wherein a tangent line at a point of reflectance of the at least one light beam reflected by the curved mirror is perpendicular to a line extending between the point of reflectance and an input axis of the block irrespective of position of the curved mirror relative to first mounting surface.

11. The optical apparatus of claim 1 wherein placement of the mirror mounting means on the first mounting surface is determined by the equation:

$$d = r * \alpha * 4.85E{-}06$$

where r is the radius of curvature of a concave reflective surface of the curved mirror, $\alpha$ is the pyramidal angle of the plurality of mounting surfaces of the block and d is the distance, relative to the thickness of the block, a center of the mirror mounting means is offset from a center of the optical cavity.

12. The optical apparatus of claim 1 wherein the light source means directs a pair of counter-rotating light beams into the optical path of the optical cavity.

13. The optical apparatus of claim 1 wherein the light source means is a laser.

14. The optical apparatus of claim 1 wherein the optical apparatus is a ring laser gyroscope.

15. A method for beam path alignment of an optical apparatus of the type that includes a block having an internal optical cavity that defines a closed loop optical path and having mirror mounting surfaces at the corners of the optical path, a light source for directing a light beam into the optical path, and mirrors for reflecting the light beam at the corners of the optical path, the method comprising the steps of:
    providing one mounting surface of the mounting surfaces with a mirror mounting means for a mirror; and
    engaging a concave reflecting surface mirror of the mirrors with the mirror mounting means, the mounting means orienting the concave reflecting surface mirror such that the light beam is aligned within the closed loop optical path and the light beam is at its maximum intensity irrespective of the position of the concave mirror relative to the one mounting surface.

16. The method of claim 15 wherein the step of providing the one mounting surface with a mirror mounting means includes the step of:
    measuring a pyramidal angle of the mirror mounting surfaces of the block.

17. The method of claim 16 wherein the step of providing the one mounting surface with a mirror mounting means further includes the step of:
    calculating the placement location of the mirror mounting means on the one mounting surface as determined by the equation:

$$d = r * \alpha * 4.85E{-}06$$

where r is the radius of curvature of a concave reflecting surface of the concave mirror, $\alpha$ is the pyramidal angle of the mirror mounting surfaces of the block and d is the distance, relative to the thickness of the block, a center of the mirror mounting means is offset from a center of the optical cavity.

18. The method of claim 17 wherein the step of providing the one mounting surface with a mirror mounting means further includes the step of:
    locating the mirror mounting means on the one mounting surface in accordance with calculated offset distance d.

19. The method of claim 18 wherein the step of providing the one mounting surface with a mirror mounting means further includes the step of:
    machining an edge surface into the one mounting surface of the block, the edge surface defining the mirror mounting means.

20. The method of claim 19 wherein the step of machining an edge surface includes the step of:
    milling a circular shaped channel into the one mounting surface of the block, the channel including inner and outer concentric sidewalls, with an intersection of the inner sidewall and the one mounting surface defining the edge surface.

21. The method of claim 20 wherein the step of engaging the concave reflecting surface mirror with the mirror mounting means includes the step of:
    securing a concave reflective surface of the concave mirror to the edge surface.

22. The method of claim 15 wherein the optical apparatus is a ring laser gyroscope.

* * * * *